Sept. 10, 1968 D. B. MARSH 3,401,274

FAIL-SAFE STANDARD AMPLITUDE SIGNAL SOURCES

Filed Sept. 10, 1965

INVENTOR.
Donald B. Marsh.
BY W. L. Stout

HIS ATTORNEY

United States Patent Office 3,401,274
Patented Sept. 10, 1968

3,401,274
FAIL-SAFE STANDARD AMPLITUDE
SIGNAL SOURCES
Donald B. Marsh, Wilkinsburg, Pa., assignor to Westinghouse Air Brake Company, Swissvale, Pa., a corporation of Pennsylvania
Filed Sept. 10, 1965, Ser. No. 486,270
15 Claims. (Cl. 307—297)

My invention relates generally to electronic signal generating circuits and, more specifically, to fail-safe standard amplitude signal sources which are particularly useful for producing square wave input signals for various electronic stages of a logic system.

In various systems using pulse logic, such as in a speed command decoder network of an automatic vehicle speed control system, it is essential and necessary to provide a source of alternating current signals having a standard or constant amplitude.

A further requirement of speed control systems of this type is that certain portions or sections of the system operate in a fail-safe manner, that is, in case of failure the safest or the most restrictive condition must prevail.

Since my invention is normally employed as a signal source for coincidence or AND gate circuits in a speed command decoder network, it is of paramount importance to ensure that during a malfunctional condition an input signal is not available for the subsequent coincidence or gating circuits. More specifically, it is essential that the amplitude of the signal source be maintained at a fixed or constant level so that the gating circuits and subsequent stages of the speed decoder network are incapable of producing false indications. For example, if the magnitude of the output signals from the signal source is permitted to exceed a predetermined level it is possible to cause erratic operation in the automatic vehicle speed control system which may result in damage to equipment or injury to persons associated with the system.

Therefore, it is an object of the present invention to provide a new and improved fail-safe standard amplitude signal source.

It is another object of the present invention to provide an improved signal generating circuit which operates in a fail-safe manner.

It is still another object of the present invention to provide an electronic signal circuit which is incapable of producing output signals exceeding a predetermined level.

A further object of the present invention is to provide a semiconductive signal generating circuit which is incapable of producing signals during a malfunctional condition.

Still another object of the present invention is to provide a fail-safe standard amplitude signal circuit which provides output signals having a constant magnitude during normal operating conditions and which provides no output signals during abnormal operating conditions.

Yet another object of the present invention is to provide a transistorized signal source which operates in a fail-safe manner and which produces alternating current signals having a standard amplitude level.

A still further object of the present invention is to provide a fail-safe standard amplitude signal source which is simple in construction, economical in cost and reliable in operation.

Briefly, the present invention includes a novel circuit arrangement having a generator means for developing a source of alternating current signals; a shunt regulating means electrically coupled to the generator means for regulating the voltage amplitude swing of the alternating current signals; and a photosensitive means coupled to the shunt regulator and arranged to continuously monitor the electrical state or condition of the shunt regulator. The photosensitive means includes a photopositive resistive element for interconnecting the regulated alternating current signals to a constant gain voltage amplifier. The output signals from the voltage amplifier are, in turn, connected to an emitter-follower amplifier which functions to reduce the effects of load variations over a wide range of impedance. An output in the form of square wave signals having a predetermined or standard amplitude level is derived from the emitter-follower amplifier.

In one form of the invention, the alternating current input signals in the form of square waves are supplied by means of an astable or free running multivibrator which oscillates at a predetermined frequency.

In another form of the invention, the input signals are supplied by means of an audio signal source and, in turn, applied to a limiting amplifier stage which driven between cut-off and heavy saturation for producing square-wave signals.

The foregoing object and other attendant features and advantages of this invention will become more fully evident from the following detailed description when considered in connection with the accompanying drawings wherein.

Figure 1:
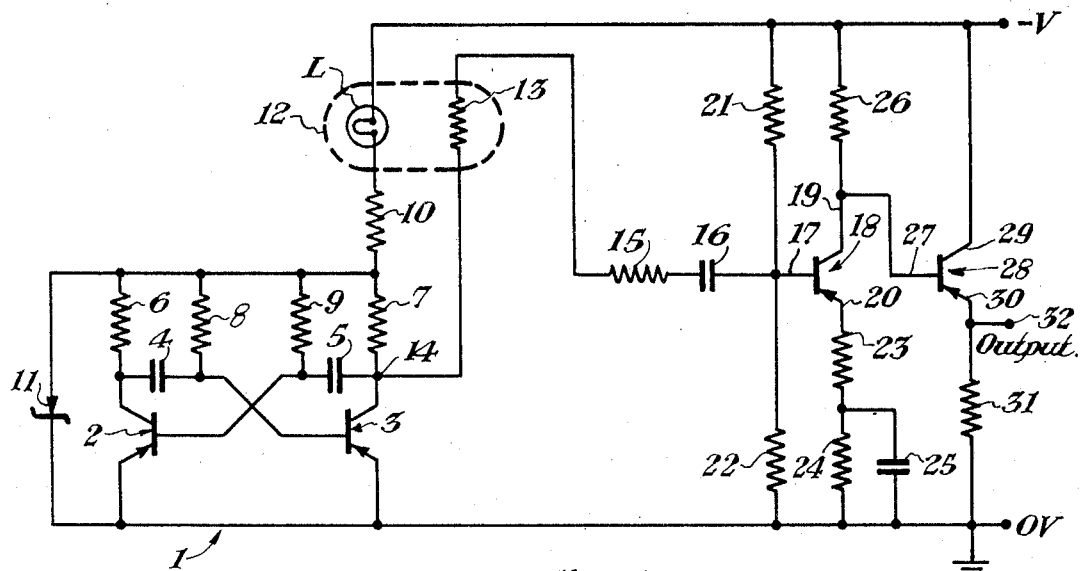
FIG. 1 is a schematic circuit diagram illustrating one embodiment of the present invention.

Referring now to the drawings wherein like components are designated by the same reference characters and, more particularly to FIG. 1, there is shown a signal generator which is generally represented by number 1. The signal generator comprises an astable or free running multivibrator having a pair of P-N-P transistors 2 and 3. As is readily apparent the multivibrator 1 includes the additional conventional circuit elements, namely, cross-coupling capacitors 4 and 5, collector resistors 6 and 7, and base resistors 8 and 9, which interconnect transistors 2 and 3, respectively, thereby forming an astable circuit arrangement. The operating power for the multivibrator as well as for the other circuit networks, which will be fully described hereinafter, may be derived from any suitable direct current voltage source. As shown the negative terminal −V of the direct current voltage source is connected to the collector load resistors 6 and 7 through lamp L and resistor 10, both of which will be described in greater detail hereinafter. The emitter electrodes of transistors 2 and 3 are directly connected to ground which in this case may be at 0 v. potential level, as shown. As is readily apparent to those skilled in the art, astable multivibrators are frequently used as a convenient source of square wave signals.

In operation, one of the transistors of the multivibrator is normally conducting while the other transistor is cut off. This operating condition prevails until the potential charge on the cross-coupling capacitor reaches a given level which is sufficient to drive the cutoff transistor into conduction. This latter conducting transistor now causes the former conducting transistor to be cut off. The action is then repeated by the other coupling capacitor so that the conductive condition of the transistors is reversed wherein square wave signals are produced. The time duration of the output signals is primarily determined by the time constant of the resistors 8 and 9 and capacitors 4 and 5 which in the present case are selected to provide a frequency of oscillation of approximately 5 kc.

While the frequency of the oscillation of the multivibrator is not critical, and therefore may be varied to provide optimum operation, the amplitude of the square wave signals is critical, and therefore must be maintained substantially at a constant level. To ensure that the output signals of the multivibrator do not rise above a given level, a shunt voltage regulator comprising a series dropping resistor 10 and a breakdown or Zener diode 11 is interconnected to the multivibrator for regulating the voltage swing of the output signals. The resistor 10 is connected through a lamp L, which will be described in more detail hereinafter, to the negative terminal —V of the source of direct current potential. The resistor 10, in turn, is coupled through Zener diode 11, which as illustrated is connected across the output or load circuit of transistors 2 and 3 of the multivibrator, to ground potential which as previously mentioned is at a zero voltage level.

As is well known to those skilled in the art, shunt voltage regulators are capable of maintaining a constant output voltage even though variations occur in either or both the source voltage or load demands. Therefore, the square wave output signals of the multivibrator are amplitude regulated, that is, the amplitude of the square wave signals varies between zero volts ground and breakdown voltage of the Zener diode 11.

As previously mentioned, the present invention operates on a fail-safe principle. A serious impediment or an inherent characteristic of shunt voltage regulators is that when the voltage regulating element, namely, Zener diode 11, fails as an open circuit, regulation is completely lost. As will be more fully described hereinafter, such a condition could result in unsafe operation and, therefore, certain measures must be employed for ensuring that the circuit is incapable of producing output signals of a greater than the standard amplitude level if such an abnormal operating condition should arise. To accomplish this end, a four-terminal photosensitive element 12 manufactured by the Raytheon Company under the name of "Rayistor," type CK1121, or any other comparable device, is utilized for monitoring the electrical condition of the Zener diode of the shunt regulator. The photosensitive element 12 consists of a light source or lamp L which, as previously mentioned, is interconnected between resistor 10 and the negative terminal —V of the direct current potential source. The photosensitive element 12 also includes a photopositive resistive component 13 whose resistance value decreases or increases in proportion to the amount of light striking it. Namely, when the lamp L is sufficiently illuminated the resistive value of element 13 is comparatively low, whereas under decreased illumination, the resistive value of element 13 markedly increases and presents a relatively high impedance.

As shown, resistor 13 is connected from the output terminal 14 of the multivibrator through a series resistive-capacitive network 15 and 16 to the base electrode 17 of the P-N-P transistor 18. A voltage divider network comprising resistors 21 and 22 is connected between the negative terminal —V of the potential source and ground potential, with the junction point of the voltage divider also coupled to the base electrode 17 of the P-N-P transistor 18. Resistors 21 and 22 of the voltage divider network, along with resistor 15, operate as a signal attenuating network. Accordingly, the amplitude of the output signals derived from terminal 15 is proportionally reduced by a predetermined fixed amount. The emitter electrode 20 of transistor 18 is connected to ground potential through a pair of series connected resistors 23 and 24. Resistor 24 is connected in parallel with a signal bypassing capacitor 25. The collector 19 of transistor 18 is connected to the negative potential terminal —V through collector load resistor 26.

It may be noted that the voltage gain of the amplifier is essentially determined by the ratio of the resistance value of resistor 26 over the resistance value of resistor 23. In the present instance, a magnitude of resistors 26 and 23 is chosen and so proportioned to provide an amplification factor which produces a stable constant gain voltage amplifier stage.

The output signals taken from collector 19 of transistor 18 are directly fed to the base electrode 27 of the P-N-P transistor 28. The collector electrode 29 of transistor 28 is directly connected to the negative terminal —V of the direct current source. The emitter electrode of transistor 28 is connected to ground potential through resistor 31. An output terminal 32 is directly connected to the emitter electrode 30. As is readily apparent, transistor 28 is connected in an emitter-follower amplifier configuration. As is well known, the gain of an emitter-follower is normally less than unity; however, for optimum operation the gain should be as close to unity as possible.

Further, it may be mentioned at this time that certain measures must be employed in the selection of resistors 13, 15 and 23 for the purpose of ensuring that these resistors are not capable of being short-circuited. Since the shorting of any of these resistors could result in the production of output signals of greater value than the standard amplitude level which could result in an unsafe condition, it is necessary to take special precautions whereby a short-circuited condition of these resistors cannot occur. Accordingly, these resistors are constructed of metal film type so that the chance of a short-circuited condition is highly improbable, if not impossible.

Turning now to the operation of the circuit, it will be assumed that the signal generator 1 is operating, namely, that the multivibrator is in a state of oscillation so that square wave voltage signals are available at terminal 14. As shown, the Zener diode 11 of the shunt regulator is connected in parallel with the output circuit of transistor 3, and therefore, the square wave signals vary between a zero voltage level, which is ground potential, and some negative potential level, which in this case is the avalanche or breakdown voltage of the Zener diode 11. That is, when transistor 3 is conducting, and assuming that the transistor has negligible voltage drop across the emitter-collector electrodes, output terminal 14 will be substantially at ground potential. Now when transistor 3 is nonconducting the potential level at terminal 14 will be substantially equal to the voltage drop across the Zener diode 11.

Assuming that the circuit is operating properly and that all the elements are intact, a sufficient amount of current is flowing through lamp L so that the lamp is fully illuminated. Under this condition, the intensity of light impinging on the photosensitive resistor 13 causes resistor 13 to assume its low impedance state.

As is readily evident, the total amount of current flowing through lamp L, which causes full illumination, is the summation of the current flowing through the Zener diode circuit and of the current flowing through the load circuit of the particular conducting transistor of the multivibrator. The parts are so chosen and proportioned that the major portion of the current flowing through lamp L is supplied by the Zener diode circuit. Further, it may be noted that under this high illuminating condition, the impedance of resistive element 13 is comparatively low and therefore negligible in comparison with the impedance of the series resistive element 15. In actual practice, the resistive value of element 13 is less than 1,000 ohms which is substantially negligible in comparison with the 18,000 ohms presented by resistor 15.

The signals developed at terminal 14 are now delivered to the base electrode 17 of the constant voltage amplifier transistor 18 through the relatively low impedance path provided by resistive elements 13 and 15 and capacitor 16. Output signals, in turn, are derived from the collector electrode of transistor 18 and are directly fed to the base electrode 27 of the emitter-follower transistor 28. Output signals in the form of square waves having a peak-to-peak value of two (2) volts are derived from output terminal 32.

Accordingly, during normal operation, square wave signals having a constant amplitude are produced at output terminal 32. Since under no circumstances are the square wave signals at terminal 14 permitted to exceed the breakdown voltage of the Zener diode 11 due to its regulating effect, a constant amplitude input signal is always applied to the base electrode 17 of the voltage amplifier transistor 18.

In order to maintain fail-safe operation, it is essential and necessary to provide that when the amplitude of the signals at terminal 14 exceeds a certain level, namely, the breakdown voltage of Zener diode 11, the circuit must be prevented from producing output signals at terminal 32. As previously mentioned, an inherent characteristic of shunt regulators is that during an open-circuited condition of the regulating element, the potential level rises to full supply voltage which in the present case could result in an unsafe condition. Therefore, in order to ensure fail-safe operation I have devised a method of rendering the circuit ineffective during such an open-circuited condition. Obviously, during periods when Zener diode 11 is open-circuited, the only current available for illuminating lamp L flows through the conducting transistor of the multivibrator. As mentioned above, the amount of illuminating current supplied by the conducting transistor only forms a small fraction of the total amount of current necessary for fully illuminating lamp L. Even with the transistors of the multivibrator operating between zero and the full value of the negative supply voltage, the amount of current supplied to lamp L is insufficient to fully illuminate the lamp. With this reduction in supply current, the amount of radiant energy produced by lamp L sharply decreases so that the impedance value of the photopositive resistive element 13 rapidly increases, thereby reverting to a high impedance state. In actual practice, the impedance value increases to approximately 200,000 ohms. This high impedance in the amplifier coupling circuit effectively blocks even the increased signals at terminal 14, so that the only output available at output terminal 32 is ambient noise. This blocking action of the coupling circuit is supplemented by the attenuating effect of the voltage amplifier input circuit to effectively block the signals at terminal 14. Accordingly, fail-safe operation of the circuit is maintained.

It is readily obvious that should the Zener diode 11 become short-circuited, no potential difference is available at terminal 14 for producing oscillations and, therefore, no square wave signals are available at terminal 32 which is a safe condition.

The open-circuiting of the various other elements either causes the loss of the supply potential, of the input signal, or of the output signal which is obviously a safe condition. Similarly, the short-circuiting of various elements with the exception of elements 13, 15 and 23, which as previously mentioned is virtually impossible due to their construction, eliminates the necessary bias, the necessary operating potentials, the necessary R–C timing constants, or the amplification factor of the active elements which, in turn, causes loss of the signals available at output terminal 32.

Thus, it can be seen that failures of either the active or passive elements cause a disappearance of an output at terminal 32 and, therefore, the system operates in a fail-safe manner.

Figure 2:
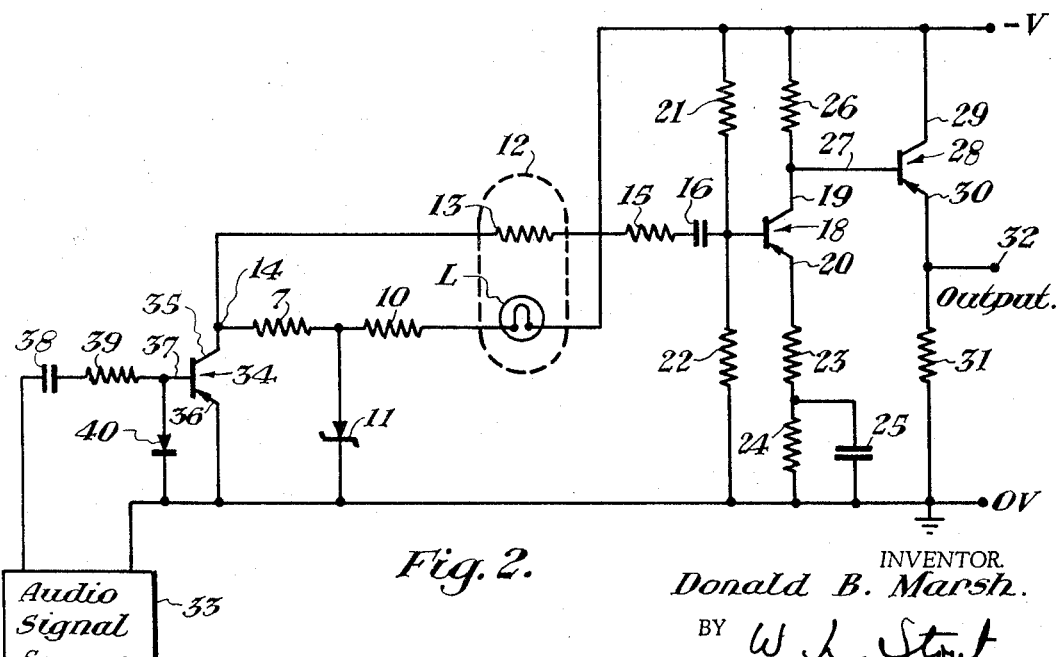
FIG. 2 is a schematic circuit diagram illustrating another embodiment of the present invention.

Referring now to FIG. 2 wherein like reference characters are applied to like elements, there is shown a second embodiment of a fail-safe standard amplitude signal source circuit. The essential difference between FIG. 2 and FIG. 1 resides in the type of signal generator employed in conjunction with the remaining circuitry.

For example, where a signal generator is not readily available, it is advisable to employ the arrangement shown in FIG. 1. However, where a suitable multivibrator or other type of audio signal source is readily available, it is advantageous to employ the arrangement shown in FIG. 2 since this latter embodiment requires a fewer number of electrical components.

For example, an output may be directly fed from the audio signal source 33 to an amplifier limiter squaring stage including a P-N-P transistor 34 having an emitter electrode 35, a collector electrode 36, and a base electrode 37. A coupling circuit including capacitor 38 and a series connected resistor 39 couples one terminal of the audio signal source to base electrode 37. The other terminal, which is ground, of the audio signal source is directly connected to the emitter electrode 35 of transistor 34. A diode 40, which will be described in further detail hereinafter, has its anode connected to the base electrode of transistor 34 and its cathode connected to ground. As is readily apparent, the audio signal source 33 may be either a square wave signal source or a sine wave signal source since the output from audio signal source 33 is limited and squared in the amplifier stage including transistor 34.

As shown, the remaining elements of the embodiment as shown in FIG. 2 are substantially identical to the elements shown in the embodiment of FIG. 1. Since the operation of these like numbered elements is identical to that described in FIG. 1, a detailed description thereof is believed unnecessary.

Turning now to the description of the operation of the audio signal source and the amplifier limiter stage, it is readily apparent that input signals are fed to the base-emitter circuit of transistor 34. While it will be assumed that the audio signal source 33 is producing sinusoidal signals, it should be noted that an audio signal source producing square wave signals would function in an identical fashion. The limiter amplifier stage is so arranged that the sinusoidal input signals drive transistor 34 between cutoff and saturation. In order to ensure that the output signals appearing on terminal 14 have a symmetrical square wave shape, a diode 40 is reversely poled across the emitter-base electrodes of transistor 34. Diode 40 operates to compensate and prevent the accumulation of a bias opposing charge across input capacitor 38. Diode 40 provides a rapid discharge path for any potential charge accumulated on coupling capacitor 38 during negative half cycles of the input signals. Similarly, the emitter diode of transistor 34 ensures rapid discharge of any potential charge accumulated on coupling capacitor 38 during positive half cycles. Accordingly, anti-biasing, which would result in an unsymmetrical output at terminal 14, is prevented.

As previously mentioned, the remaining elements of FIG. 2 operate in identical fashion as the corresponding elements illustrated in FIG. 1. Namely, the voltage swing or excursion of the square wave signals at terminal 14 is between zero volts ground and the potential level determined by the breakdown voltage characteristic of Zener diode 11. The photosensitive element 12 monitors the electrical condition of the Zener diode of the shunt regulator and, in case of an open circuit of the Zener diode, operates to effectively block the signals at terminal 14. That is, under normal operating conditions, the photopositive resistive element 13 presents a low impedance due to the high illuminating condition of lamp L, whereas during an open-circuit condition of the Zener diode the photopositive resistive element 13 presents a high impedance due to the low illuminating condition of lamp L. As in the embodiment of FIG. 1, the Zener diode current is relatively large in comparison to the operating current of transistor 34. Therefore, under an open-circuited condition of Zener diode 11, the operating current of transistor 34 is wholly insufficient to fully illuminate lamp L so that the photopositive resistive element assumes a high impedance. The voltage amplifier including transistor 18 and emitter-follower stage including transistor 28 operate in identical fasion to their corresponding counterparts of FIG. 1 and result in a two (2) volt P-P output being available at terminal 32.

The necessary safety features are also included in the embodiment of FIG. 2 so that output signals having a two (2) volt peak-to-peak value are only produced during a normal operating condition. Accordingly, the circuit operates in a fail-safe manner to produce square wave output signals having a constant amplitude.

Further, it may be mentioned that the circuit functions as a fail-safe alternating current standard amplitude source, whose amplitude is independent of supply voltage so long as the supply voltage remains above a minimum level. Additionally, it can be seen that failures of either the active or passive elements are incapable of producing an erroneous or false output so that the circuit is fail-safe also from this standpoint.

A further advantage of my invention is that component failures can be readily ascertained and quickly remedied due to the fail-safe operating mode of the circuit.

Although N type or P-N-P transistors have been illustrated, it is to be understood that transistors of opposite conductivity, that is, P type or N-P-N transistors, may be used in practicing the present invention by merely reversing the polarity of the supply potential and the diodes, as is well known.

It will also be appreciated that while this invention finds particular utility in speed control systems, it is readily evident that the invention is not merely limited thereto, but may be employed in various systems and apparatus which requires the security and safety inherent in this invention. But regardless of the manner in which the invention is used, it is understood that various alterations may be made by persons skilled in the art without departing from the spirit and scope of this invention. It will also be apparent that other modifications and changes can be made in the present described invention and, therefore, it is understood that all changes, equivalents, and modifications within the spirit and scope of the present invention are herein meant to be included in the appended claims.

Having thus described my invention, what I claim is:

1. A fail-safe electrical circuit for generating alternating current signals having a constant amplitude comprising, in combination: signal generating means for developing alternating current signals, regulator means electrically coupled to said signal generating means for regulating the voltage amplitude of the alternating current signals, monitor means electrically coupled to said regulator means for monitoring the electrical condition of said regulator means and for effectively blocking said alternating current signals during an open-circuited condition of said voltage regulator, and amplifier means electrically coupled through said monitor means to said signal generating means and having output terminal means for deriving said alternating current signals having a constant amplitude.

2. A fail-safe electrical circuit as set forth in claim 1, wherein said signal generating means comprises an astable multivibrator.

3. A fail-safe electrical circuit as set forth in claim 1, wherein said signal generating means comprises an audio signal source and a limiting amplifier stage.

4. A fail-safe electrical circuit as set forth in claim 1, wherein said regulator means comprises a Zener type diode and a resistor.

5. A fail-safe electrical circuit as set forth in claim 1, wherein said monitor means comprises a photosensitive element having a lamp and a photopositive resistive element.

6. A fail-safe electrical circuit as set forth in claim 1, wherein said amplifier means comprises a constant gain voltage amplifier stage and an emitter-follower stage.

7. A fail-safe standard amplitude signal source comprising: a free-running multivibrator having at least one output terminal for developing square wave signals, a voltage regulator including a breakdown diode electrically coupled to said multivibrator for regulating the voltage amplitude of said square wave signals, a photosensitive monitoring device having a lamp electrically coupled to said voltage regulator and having a photopositive resistive element electrically coupled to said multivibrator output terminal, a voltage amplifier stage having an input attenuating network electrically coupled to said photopositive resistive element, and an emitter-follower stage directly coupled to the output of said voltage amplifier and having an output terminal for deriving square-wave output signals having a constant amplitude.

8. A fail-safe standard amplitude signal source as defined in claim 7, wherein said lamp is illuminated, during periods when said voltage regulator is operating properly, an amount to cause said photopositive resistive element to assume a relatively low impedance state whereby the constant square-wave signals are available at the output terminal of said emitter-follower, and wherein said lamp is illuminated a lesser amount during periods when said voltage regulator is open-circuited thereby causing said photopositive resistive element to assume a high impedance state whereby the square wave signals at the output terminal of said multivibrator are effectively blocked.

9. A fail-safe standard amplitude signal source comprising: an audio signal source for producing alternating current signals, means electrically coupling the alternating current signals to a limiter amplifier stage which operates between cutoff and saturation, said limiter amplifier having an output terminal for delivering square wave signals, a voltage regulator having a breakdown diode electrically coupled to said limiter amplifier for regulating the voltage amplitude of said square wave signals, a photosensitive monitoring device having a lamp electrically coupled to said voltage regulator and having a photopositive resistive element electrically coupled to limiter amplifier output terminal, a voltage amplifier having an attenuating network electrically coupled to said photopositive resistive element, and an emitter-follower stage directly coupled to said voltage amplifier and having an output terminal for deriving square wave output signals having a constant amplitude.

10. A fail-safe standard amplitude signal source as defined in claim 9 wherein said lamp is illuminated during periods when said voltage regulator is operating properly an amount sufficient to cause said photopositive resistive element to assume a relatively low impedance state whereby the constant square-wave signals are available at the output terminal of said emitter-follower and wherein said lamp is illuminated a lesser amount during periods when said voltage regulator is open-circuited thereby causing said photopositive resistive element to assume a high impedance state whereby the square wave signals at the output terminal of said limiter amplifier are effectively blocked.

11. A fail-safe standard amplitude signal source as defined in claim 9 wherein said means includes diode means for providing that the square wave signals at limiter amplifier output terminal are symmetrical.

12. A fail-safe standard amplitude signal source comprising: a source of supply potential having a pair of terminals, a multivibrator having a first and a second transistor each having an emitter, a collector and a base electrode, capacitor means cross-coupling the collector electrode of each of said transistors to the base electrode of the other of said transistors, a voltage regulator including a Zener type diode and a current limiting resistor adapted to be connected to said source of supply potential, collector load resistors coupling the collector electrodes of each of said transistors to said voltage regulator, base biasing resistors coupling the base electrodes of each of said transistors to said voltage regulator, the emitter electrodes of each of said transistors directly connected to one of said pair of terminals of said supply source, a monitoring means including a light source connected between said current limiting resistor and the other of said pair of terminals of said supply source, said monitoring means including a photo-sensitive resistive element electrically connected to the collector electrode of one of said first and second transistors, a third transistor having an emitter, a collector and a base electrode, a voltage divider including a pair of resistors connected across said source of supply potential with the junction point of said voltage divider connected to the base electrode of said third transistor, a series resistor-capacitor network coupling said photosensitive resistive element to the junction point of said voltage divider, a collector load resistor coupling the collector electrode of said third transistor to the other of said pair of terminals of said supply source, a pair of series connected resistors coupling the emitter electrode of said third transistor to the one of said pair of terminals of said supply source, a capacitor connected across one of said pair of series connected resistors, a fourth transistor having an emitter, a collector and a base electrode, the base electrode of said fourth transistor directly connected to the collector electrode of said third transistor, the collector electrode of said fourth transistor directly connected to the other of said pair of terminals of said supply source, a resistor connecting said emitter electrode of said fourth transistor to the one of said pair of terminals of said supply source, and an output terminal connected to the emitter electrode of said fourth transistor.

13. A fail-safe standard amplitude signal source comprising: an audio signal source having a pair of output terminals, a first transistor having an emitter, a collector and a base electrode, a resistor-capacitor network coupling the base electrode of said first transistor to one of said pair of output terminals, the emitter electrode of said first transistor directly connected to the other of said pair of output terminals, a diode connected between the emitter-base electrodes of said first transistor, a source of supply potential having a pair of terminals, a voltage regulator including a Zener type diode and a current limiting resistor adapted to be connected to said source of supply potential, a load resistor coupling the collector electrode of said first transistor to said voltage regulator, the emitter electrode of said first transistor directly connected to one of said pair of terminals of said supply source, a monitoring means including a light source connected between said current limiting resistor and the other of said pair of terminals of said supply source, said monitoring means including a photosensitive resistive element electrically connected to the collector electrode of said first transistor, a second transistor having an emitter, a collector and a base electrode, a voltage divider including a pair of resistors connected across said source of supply potential with the junction point of said voltage divider connected to the base electrode of said second transistor, a resistor-capacitor network coupling said photosensitive resistive element to the junction point of said voltage divider, a collector load resistor coupling the collector electrode of said second transistor to the other of said pair of terminals of said supply source, a pair of series connected resistors coupling the emitter electrode of said second transistor to the one of said pair of terminals of said supply source, a capacitor connected across one of said pair of series connected resistors, a third transistor having an emitter, a collector and a base electrode, the base electrode of said third transistor directly connected to the collector electrode of said second transistor, the collector electrode of said third transistor directly connected to the other of said pair of terminals of said supply source, a resistor connecting said emitter electrode of said third transistor to the one of said pair of terminals of said supply source, and an output terminal connected to the emitter electrode of said third transistor.

14. A fail-safe standard amplitude signal circuit comprising, means for producing a source of signals, means electrically connected to said source means for regulating the amplitude of said signals, means electrically connected to said regulating means for monitoring the electrical state of said regulating means, and means having said regulated signals connected thereto and producing output signals having a predetermined amplitude.

15. A fail-safe circuit for providing output signals having a predetermined amplitude comprising, in combination, generator means for producing periodical wave signals, regulator means connected to said generator means for regulating the amplitude of said signals, monitor means connected to said regulator means for checking the electrical condition of said regulator means, and amplifier means coupled through said monitoring means to said generator means for producing the output signals having a predetermined amplitude.

References Cited

UNITED STATES PATENTS

| 3,202,926 | 8/1965 | Ford et al. | 250—211 XR |
| 3,360,744 | 12/1967 | Blitz et al. | 331—113 XR |

ARTHUR GAUSS, *Primary Examiner.*

E. C. FOLSOM, *Assistant Examiner.*